(12) United States Patent
Hughes et al.

(10) Patent No.: US 6,564,373 B1
(45) Date of Patent: May 13, 2003

(54) INSTRUCTION EXECUTION MECHANISM

(75) Inventors: Kevin Hughes, Glossop (GB); Martin Pixton, Sandbach (GB)

(73) Assignee: International Computers Limited, London (GB)

( * ) Notice: Subject to any disclaimer, the term of this patent is extended or adjusted under 35 U.S.C. 154(b) by 0 days.

(21) Appl. No.: 09/522,579

(22) Filed: Mar. 10, 2000

(30) Foreign Application Priority Data

Mar. 24, 1999 (GB) ............................................. 9906652

(51) Int. Cl.[7] ................................................ G06F 9/45
(52) U.S. Cl. ...................... 717/158; 717/127; 717/159; 712/227
(58) Field of Search ............................... 712/209, 227; 717/151–153, 158, 159

(56) References Cited

U.S. PATENT DOCUMENTS

| | | | | |
|---|---|---|---|---|
| 5,428,786 A | * | 6/1995 | Sites .......................... | 717/151 |
| 5,507,030 A | * | 4/1996 | Sites .......................... | 717/136 |
| 5,590,329 A | * | 12/1996 | Goodnow et al. .......... | 717/144 |
| 5,613,118 A | * | 3/1997 | Heisch et al. .............. | 717/158 |
| 5,721,927 A | | 2/1998 | Baraz ......................... | 395/705 |
| 5,751,982 A | | 5/1998 | Morley ....................... | 395/800 |
| 5,894,576 A | * | 4/1999 | Bharadwaj .................. | 717/156 |
| 5,950,009 A | * | 9/1999 | Bortnikov et al. .......... | 717/158 |
| 6,044,220 A | * | 3/2000 | Breternitz, Jr. ............. | 717/139 |
| 6,192,513 B1 | * | 2/2001 | Subrahmanyam ........... | 717/155 |

FOREIGN PATENT DOCUMENTS

| | | |
|---|---|---|
| EP | 0 927 929 | 7/1999 |
| EP | 0 930 572 | 7/1999 |
| WO | WO 92/15937 | 9/1992 |

* cited by examiner

*Primary Examiner*—Gregory Morse
*Assistant Examiner*—Kenneth A Gross
(74) *Attorney, Agent, or Firm*—Barnes & Thornburg

(57) ABSTRACT

On completion of execution of a current block of instructions, a block completion process searches for potential successor blocks, using block descriptors and egress data structures. For each potential successor block, the process compares a set of entry conditions associated with the block with the exit conditions of the current block and, if a match is found, selects the potential successor block as the current block and executes it. A consistency check is performed, to compare the block identity of the successor block with an expected block identity. Block-following code is selectively planted into translated blocks, to call a successor block directly, by-passing the block completion process. The block-following code is optimised, in that it contains tests for entry conditions only if the results of those tests are not known at the time the block-following code is planted.

10 Claims, 2 Drawing Sheets

INSTRUCTION EXECUTION MECHANISM

BACKGROUND TO THE INVENTION

This invention relates to a mechanism for executing instructions in a computer system.

The invention is particularly concerned with a computer system in which source code instructions are translated into target code instructions for execution on a particular processor. This may be required, for example, where one processor is being used to emulate another, in which case the instructions for the processor being emulated must be translated into instructions for the emulating processor.

One approach, referred to as interpretation, is to create a software model of the instruction set of the processor being emulated. This model operates by reading each target instruction, decoding it, and selecting one of a number of sequences that perform the same function as the instruction being emulated. This fetch/decode/execute sequence is repeated for each source code instruction in turn.

A more efficient approach is to translate a block of source code instructions, rather than a single instruction. That is, the source code is divided into blocks, and each source code block is translated into a block of target code instructions, functionally equivalent to the source code block. Typically, a block has a single entry point and one or more exit points. The entry point is the target of a source code jump, while the (or each) exit is a source code jump.

Translating blocks is potentially much more efficient, since it provides opportunities for eliminating redundant instructions within the target code block, and other optimisations. Known optimising compiler techniques may be employed for this purpose. To increase efficiency further, the target code blocks may be held in main memory and/or a cache store, so that they are available for re-use if the same section of code is executed again, without the need to translate the block.

The present invention is concerned with the problem of sequencing the execution of such blocks, to ensure that each block is followed by an appropriate successor block. The object of the present invention is to provide an improved method for sequencing execution of code blocks.

SUMMARY OF THE INVENTION

According to the invention, a method of executing instructions in a computer system, comprises:
(a) storing a plurality of blocks of instructions, each block having a specified set of entry conditions associated with it;
(b) on completion of execution of a current block of instructions, searching for potential successor blocks; and
(c) for each potential successor block, comparing the set of entry conditions associated with that block with the exit conditions of the current block of instructions and, if a match is found, selecting the potential successor block as the current block and executing it.

It will be seen that the invention permits the use of multiple blocks for different entry conditions. The use of such multiple blocks is advantageous, in that each block can be tailored to its specific entry conditions, thereby improving its efficiency of execution. A preferred form of the invention also allows block-following code to be planted in the blocks, to optimise the sequencing between the blocks.

One embodiment of the invention will now be described by way of example with reference to the accompanying drawings.

DESCRIPTION OF AN EMBODIMENT OF THE INVENTION

Figure 1:
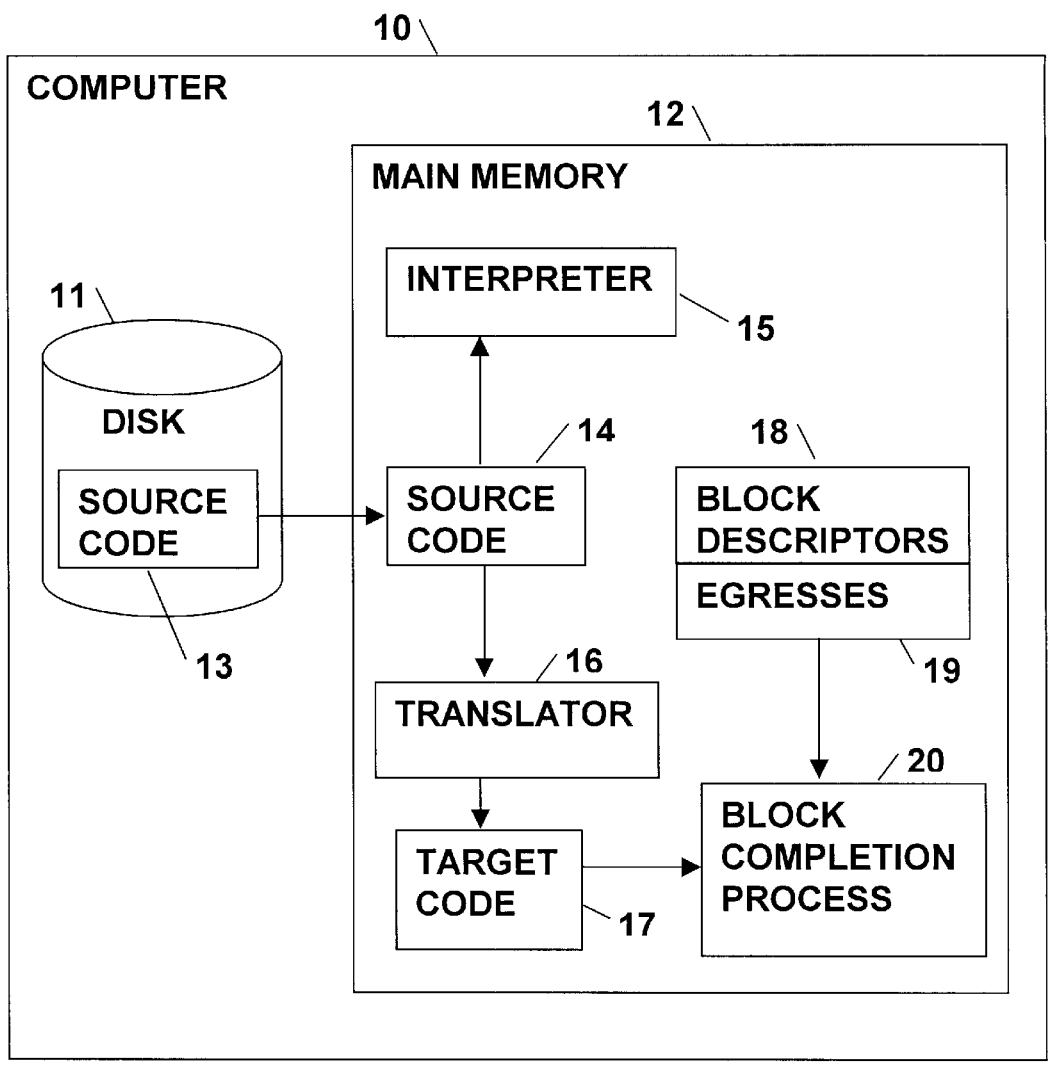
FIG. 1 is a block diagram showing an instruction execution mechanism embodying the invention.

FIG. 1 shows a host computer system 10, including a disk memory 11, and a main memory 12.

The disk memory holds a number of source code blocks 13. As will be described, these blocks are copied (paged) into the main memory on demand. Therefore, at any given time, the main memory holds a number of source code blocks 14, corresponding to a subset of the blocks 13 in the disk memory.

The source code blocks consist of sequences of instructions in a source instruction set, which in this example is assumed to be the ICL VME instruction set. Each of the source code blocks has a set of entry conditions associated with it, these entry conditions consisting of:

The program counter (PC) value at entry to the block.

The accumulator size (ACS) value at entry to the block.

It should be noted that a plurality of source code blocks may exist with the same PC, each having a different ACS value.

An interpreter program 15 is provided for executing the source code blocks 14 in the cache. The interpreter takes each source code instruction in turn, decodes it, and selects one of a number of target code sequences in the instruction set of the host computer that perform the same function as the source code instruction. Details of the interpreter are not relevant to the present invention, and so it will not be described in any further detail.

A translator program 16 is also provided. This can be called, as will be described, to translate a selected source code block 14 into a target code block 17, in the instruction set of the host computer. The translation takes account of the current entry conditions for the block, so that each translated block is specific to a particular set of entry conditions. Details of the translator are not relevant to the present invention, and so it will not be described in any further detail.

Each source code block may have a block descriptor 18 associated with it. Each block descriptor contains the following information:

BID An identity number, uniquely identifying this block descriptor.
BACS The accumulator size (ACS) on entry into the block.
BPC The program counter (PC) value on entry into the block.
BNIB The address of the translated target code (if any) corresponding to the source code block.
USAGE A count of the number of times the block has been executed.

When a new block descriptor is required, if there is no space in memory for creating a new block descriptor, an existing block descriptor may be reused.

Every time a block descriptor is created or reused, it is allocated a new block identifier BID equal to a global block identifier value GLOBAL_BID, and GLOBAL_BID is then incremented. This ensures that each block has a unique BID value. (When GLOBAL_BID eventually reaches its maximum value, it will be reset to zero, and in this case all existing block descriptors and target code blocks must be flushed from the cache. However, this will happen only rarely).

The way in which the code blocks are threaded together is specified by data structures 19, referred to herein as egresses, linked to the block descriptors 18. Each block descriptor may have one or more egresses linked to it. Each egress contains information relating to a potential successor block for the current block, as follows:

BPC The program counter (PC) value on entry into the successor block.
BID The identity number of the block descriptor associated with the successor block.
BLK The address of the block descriptor associated with the successor block.
BOPT A flag, indicating whether or not block-following code has been planted into the target code for this egress.

In general, whenever execution of a code block is completed (either execution of source code by the interpreter, or execution of a translated target code) a block completion process 20 is executed, to select the appropriate successor block. The exception to this is the case where a translated block contains block-following code. In that case, the block-following code may cause a jump to the required successor block, directly from the translated code, without executing the block completion process, as will be described.

Figure 2:
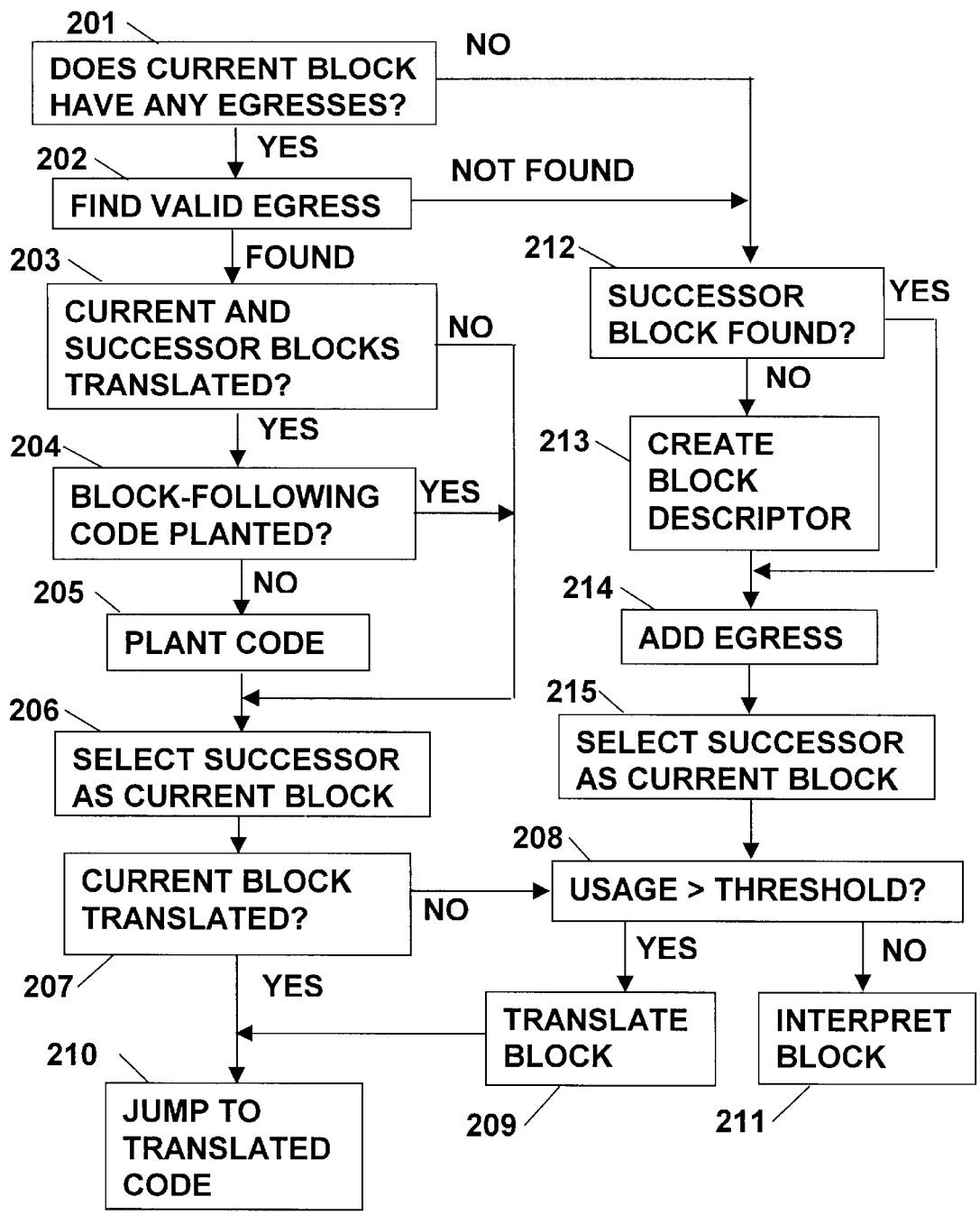
FIG. 2 is a flow chart of a block completion process.

The block completion process 20 will now be described with reference to FIG. 2.

(Step 201) The process first accesses the block descriptor 18 associated with the current code block (i.e. the code block that has just completed), and checks whether this descriptor has any egresses 19 linked to it.

(Step 202) If there are one or more egresses linked to the current block, the process selects each egress in turn, and performs a test to check whether this is a valid egress for the current conditions. This test can be expressed as follows:

| | |
|---|---|
| current_block.egress.BLK != NULL | AND |
| PC == current_block.egress.BPC | AND |
| ACS == current_block.egress.BLK->BACS | AND |
| Current_block.egress.BID == current block.egress.BLK->BID | |

The first line of this test checks that the BLK value in the egress is not null, i.e. the egress points to a valid successor block. The second line checks that the current program counter value (PC) is equal to the BPC value in the egress. The third line checks that the current accumulator size (ACS) is equal to the BACS value in the descriptor pointed to by the BLK value in the egress. The second and third lines therefore check that the entry conditions for the successor block are the same as the conditions on exit from the current block. The fourth line is a consistency check, which confirms that the BID value in the egress equals the BID value in the descriptor pointed to by the BLK value in the egress. This consistency check is necessary to ensure that the block pointed to by the egress is the same block as when the egress was created, i.e. the block descriptor has not been re-used. The egress is considered valid only if all four of these conditions are true.

(Step 203) If a valid egress is found in Step 202, the process performs a test to check whether both the current block and the successor block have been translated:

current_block.egress.BLK->BNIB!=NULL

AND current_block.BNIB!=NULL

The first line of this test checks that the BNIB value in the descriptor pointed to by the BLK value in the egress is not null. The second line checks that the BNIB value in the current block descriptor is not null. If both of these conditions are true, the process continues at Step 204; otherwise it goes to Step 206.

(Step 204) The process checks the BOPT flag in the selected egress to determine whether or not block-following code has been planted for this particular block-to-block link. If BOPT is False, the process continues at Step 205; otherwise it goes to Step 206.

(Step 205) The process plants block-following code into the current translated block, to link the current block to its successor. This code will be performed next time this block is executed.

(Step 206) The process then performs the action:

Current_block=current_block.egress.BLK.

This designates the successor block (i.e. the block indicated by the BLK value in the egress) as the new current block.

(Step 207) The process then checks the BNIB value in the current block descriptor. If it is null, this indicates that the block has not been translated, and the process continues at Step 208. Otherwise, it continues at Step 210.

(Step 208) The process checks whether the USAGE count in the current block descriptor is greater than a predetermined threshold value, indicating that the (as yet untranslated) block has been executed more than a certain number of times. If the USAGE count is greater than the threshold, the process continues at Step 209; otherwise, it proceeds to Step 211.

(Step 209) The process calls the translator 16, to translate the block. The translated code is stored in the main memory, and the BNIB value in the current block descriptor is set equal to the address of the translated code.

The translated code has two entry points: a first entry point which is used when entry is made from the block completion process, and a second entry point for use when entry is made from block-following code.

(Step 210) A jump is then made to the first entry point of the translated code, and this code is executed.

(Step 211) If the USAGE count is not greater than the threshold, the process calls the interpreter 15, to execute the source code block. The USAGE count is incremented.

(Step 212) If it was found at Step 201 that the current block does not have any egresses, or if no valid egresses were found at Step 202, the process searches through the block descriptors 14, looking for a successor block whose entry conditions match the exit conditions (PC, ACS) of the current block.

(Step 213) If the required successor block is not found in the current set of block descriptors, then the source code 13,14 is explored to find the required successor block, i.e. to find the source code block whose entry conditions match the exit conditions (PC, ACS) of the current block, and a new block descriptor 18 is created to describe it. In the new block descriptor, BACS and BPC are set equal to the values of ACS and PC on exit from the current block, BNIB is set to NULL, and USAGE is set to 0.

(Step 214) A new egress, pointing to the successor block, is then created and linked to the current block descriptor. The BOPT flag in the new egress is set to FALSE.

(Step 215) The process then designates the successor block as the new current block. Operation continues at Step 208 as described above.

In summary, it can be seen that on completion of a block, the block completion process searches for potential successor blocks. For each potential successor, the entry conditions (PC, ACS) associated with that block are compared with the conditions on exit from the current block. If they match, the successor block becomes the new current block, and a jump is made to it.

The block-following code planted at Step 205 above will now be described. The block-following code planted depends on whether the values of PC and ACS on exit from the block are predictable at the time the block-following code is planted, or can be determined only at run time. There are four cases, as follows.

Case 1: both PC and ACS are predictable. In this case, the block-following code includes an unconditional jump to the translated code for the successor block, as follows:
JUMP current_block.egress.BLK->BNIB.

Case 2: PC not predictable, ACS predictable. In this case, the block-following code includes the following:
IF current_block.egress.PC==PC
THEN
    JUMP current_block.egress.BLK->BNIB
END IF In other words, a jump is made to the translated code for the successor block, only if the PC value on entry to the successor block is equal to the current PC value.

Case 3: PC predictable, ACS not predictable. In this case, the block-following code includes the following:
IF current_block.egress.BLK->BACS==ACS
THEN
    JUMP current_block.egress.BLK->BNIB
END IF In other words, a jump is made to the translated code for the successor block, only if the ACS value on entry to the successor block is equal to the current ACS value.

Case 4: both PC and ACS are unpredictable. In this case, the block-following code includes the following:
IF current_block.egress.PC==PC AND
current_block.egress.BLK->BACS==ACS
THEN
    JUMP current_block.egress.BLK->BNIB
END IF In other words, a jump is made to the translated code for the successor block, only if both the PC and ACS value on entry to the successor block are equal to the current PC and ACS values.

Thus, the block-following code is optimised, in that it contains tests for entry conditions only if the results of those tests are unknown or unpredictable at the time the block-following code is planted.

The values current_block.egress.PC, current_block.egress.BLK and current_block.egress.BLK->BACS are planted as literal values, and hence do not require access to the egress data structure.

If all the tests in the block-following code are successful, a jump will be made to the translated code for the successor block without having to call the block completion process. Otherwise, the block completion process 20 will be called.

As mentioned above, each translated target code block 17 has two entry points: a first entry point which is used when entry is made from the block completion process 20, and a second entry point for use when entry is made from the block-following code.

The second entry point performs the following consistency check:
IF parent_block.BID!=current_block.egress.BLK->BID
THEN
    Return to block completion process
END IF
Current_block=current_block.egress.BLK
where parent_block is the block from which this code was generated.

In this consistency check, parent_block.BID is planted as a literal value, and hence does not require access to the egress data structure.

This consistency check confirms that the block identifier of the block being entered is equal to the expected block identifier. If so, this block is designated as the new current block, and execution of the translated code continues. Otherwise, the block completion process 20 is returned to.

It can be seen that planting the block-following code improves performance, because it by-passes the standard block completion process 20 in cases where it is known that a valid translated successor block exists, with the correct entry conditions. Performance is also improved because the block-following code contains literal values, and so does not require to access the egress data structures.

SOME POSSIBLE MODIFICATIONS

It will be appreciated that many modifications may be made to the system described above without departing from the scope of the present invention. For example, entry conditions other than (or additional to) PC and ACS may be tested for.

What is claimed is:

1. A method of executing instructions in a computer system, the method comprising:
   (a) storing a plurality of blocks of instructions, each block having a specified set of entry conditions associated with it;
   (b) executing a current block of instructions to produce a set of run-time exit conditions;
   (c) on completion of execution of said current block of instructions, searching for potential successor blocks; and
   (d) for each potential successor block, comparing the set of entry conditions associated with that block with the run-time exit conditions of the current block of instructions and, if a match is found, selecting the potential successor block as the current block and executing it.

2. A method according to claim 1, further including selectively planting executable block-following code into the current block of instructions on completion of execution of said current block of instructions, said executable block-following code including instructions to call a successor block directly when said current block of instructions is next executed.

3. A method according to claim 2 wherein the planted block-following code is optimised, in that it contains tests for entry conditions only if the results of those tests are not known at the time the block-following code is planted.

4. A method according to claim 1 including
(a) creating a number of block descriptors, each of which holds information relating to a particular block; and
(b) creating a number of egress data structures, each associated with one of the block descriptors, each egress pointing to a potential successor block; and
(c) accessing the egress data structure for the potential successor block to obtain the entry conditions for that block.

5. A method of executing instructions in a computer system, the method comprising:
(a) storing a plurality of blocks of instructions, each block having a specified set of entry conditions associated with it; and
(b) planting executable block-following code into at least some of said blocks, and
(c) executing a current block of instructions to produce a set of run-time exit conditions for said current block;
(d) said executable block-following code including tests to determine whether the run-time exit conditions for the current block match the entry conditions for a specified successor block;
(e) wherein if said tests are satisfied the executable block-following code causes a jump directly to the specified successor block.

6. A method according to claim 5 wherein the block-following code is optimised, in that it contains tests for exit conditions only if those exit conditions are unpredictable at the time the block-following code is planted.

7. A method according to claim 5 wherein, if said tests are not successful, the block-following code calls a block-completion process to search for a successor block whose entry conditions match the exit conditions of the current block.

8. A method according to claim 5 wherein, on entry from the block-following code of a predecessor block, the successor block performs a consistency check to confirm that it is the correct successor block and, if this consistency check is unsuccessful, the successor block calls a block-completion process to search for a successor block whose entry conditions match the exit conditions of the predecessor block.

9. A method according to claim 5 wherein the block-following code is planted into a block only if that block and its successor block have both been translated into the native instruction code of the computer system.

10. A method of executing instructions in a computer system, the method comprising:
(a) storing a plurality of blocks of instructions;
(b) storing a plurality of data structures holding information on entry conditions and potential successor blocks for each of the blocks of instructions;
(c) executing a current block of instructions to produce a set of run-time exit conditions;
(d) on completion of execution of said current block of instructions, searching the data structures to locate a successor block whose entry conditions match the run-time exit conditions of the current block of instructions; and
(e) if a successor block whose entry conditions match the run-time exit conditions of the current block of instructions is found, selecting that successor block as the current block and executing it.

* * * * *